United States Patent [19]

Nakanishi et al.

[11] Patent Number: 4,481,915
[45] Date of Patent: Nov. 13, 1984

[54] HELICALLY-SHAPED INTAKE PORT OF AN INTERNAL COMBUSTION ENGINE

[75] Inventors: Kiyoshi Nakanishi; Takeshi Okumura; Mutsumi Kanda; Takeshi Kotani, all of Susono; Tokuta Inoue, Mishima, all of Japan

[73] Assignee: Toyota Jidosha Kabushiki Kaisha, Japan

[21] Appl. No.: 490,321

[22] Filed: May 2, 1983

[30] Foreign Application Priority Data

May 11, 1982 [JP] Japan .............................. 57-077479

[51] Int. Cl.³ ............................................. F02F 1/42
[52] U.S. Cl. ................................. 123/188 M; 123/308
[58] Field of Search ............... 123/188 M, 52 M, 306, 123/308, 432

[56] References Cited

U.S. PATENT DOCUMENTS

| | | | |
|---|---|---|---|
| 3,850,479 | 11/1974 | Boyhont et al. | 302/29 |
| 3,884,209 | 5/1975 | List et al. | 123/188 M |
| 4,159,011 | 6/1979 | Sperry | 123/188 M |
| 4,174,686 | 11/1979 | Shimizu et al. | 123/308 |
| 4,201,165 | 5/1980 | Tanaka et al. | 123/568 |
| 4,246,874 | 1/1981 | Nakagawa et al. | 123/308 |
| 4,253,432 | 3/1981 | Nohira et al. | 123/52 M |
| 4,256,062 | 3/1981 | Schafer | 123/52 M |
| 4,257,384 | 3/1981 | Matsumoto | 123/575 |
| 4,286,554 | 9/1981 | Okamoto | 123/188 M |
| 4,312,309 | 1/1982 | Nakanishi et al. | 123/188 M |
| 4,411,226 | 10/1983 | Okumura et al. | 123/188 M |
| 4,438,741 | 3/1984 | Okumura et al. | 123/188 M |

FOREIGN PATENT DOCUMENTS

| | | | |
|---|---|---|---|
| 2059008 | 6/1972 | Fed. Rep. of Germany . | |
| 0143289 | 8/1980 | German Democratic Rep. | 123/188 M |
| 127113 | 9/1977 | Japan . | |
| 54-58129 | 5/1979 | Japan . | |
| 0035177 | 3/1980 | Japan | 123/188 M |
| 56-54922 | 5/1981 | Japan . | |
| 57-68519 | 4/1982 | Japan . | |
| 0183521 | 11/1982 | Japan | 123/306 |
| 0028525 | 2/1983 | Japan | 123/306 |

Primary Examiner—Ira S. Lazarus
Attorney, Agent, or Firm—Parkhurst & Oliff

[57] ABSTRACT

An engine comprising an intake port which has a separating wall projecting downwardly from the upper wall of the intake port. The separating wall defines a helical portion, an inlet passage portion tangentially connected to the helical portion, and a bypass passage interconnecting the inlet passage portion to the helical portion. A rotary valve is arranged in the bypass passage and actuated by a vacuum operated diaphragm apparatus. The rotary valve is opened when the amount of air fed into the cylinder of an engine is increased beyond a predetermined value. A downwardly projecting rib is formed on the bottom face of the separating wall. The rib extends toward the helical portion from the rotary valve.

23 Claims, 12 Drawing Figures

HELICALLY-SHAPED INTAKE PORT OF AN INTERNAL COMBUSTION ENGINE

BACKGROUND OF THE INVENTION

The present invention relates to a helically-shaped intake port of an internal combustion engine.

A helically-shaped intake port normally comprises a helical portion formed around the intake valve of an engine, and a substantially straight inlet passage portion tangentially connected to the helical portion. However, if such a helically-shaped intake port is so formed that a strong swirl motion is created in the combustion chamber of an engine when the engine is operating at a low speed under a light load, that is, when the amount of air fed into the cylinder of the engine is small, since air flowing within the helically-shaped intake port is subjected to a great flow resistance, a problem occurs in that the volumetric efficiency is reduced when the engine is operating at a high speed under a heavy load, that is, when the amount of air fed into the cylinder of the engine is large.

In order to eliminate such a problem, the inventor has proposed a helically-shaped intake port in which a bypass passage, branched off from the inlet passage portion and connected to the helix terminating portion of the helical portion, is formed in the cylinder head of an engine. A flow control valve is arranged in the bypass passage and opened when the engine is operating under a heavy load at a high speed. In this helically-shaped intake port, when the engine is operating under a heavy load at a high speed, a part of the air introduced into the inlet passage portion is fed into the helical portion of the helically-shaped intake port via the bypass passage. Consequently, since the flow area of the intake port is increased when the engine is operating under a heavy load at a high speed, it is possible to increase the volumetric efficiency. However, in this helically-shaped intake port, since the bypass passage is formed by a tubular passage which is completely separated from the inlet passage portion, the bypass passage has a relatively great flow resistance. In addition, since it is necessary to form the bypass passage at a position adjacent to the inlet passage portion, the cross-sectional area of the bypass passage is restricted by the presence of the inlet passage portion. Consequently, it is difficult to obtain a satisfactorily high volumetric efficiency. In addition, the helically-shaped intake port has a complicated construction itself and, thus, if the bypass passage completely separated from the inlet passage portion is additionally provided, the entire construction of the intake port becomes extremely complicated. Therefore, it is considerably difficult to form the helically-shaped intake port equipped with such a bypass passage in the cylinder head.

SUMMARY OF THE INVENTION

An object of the present invention is to provide a helically-shaped intake port having a novel construction which can be easily manufactured and is capable of obtaining a high volumetric efficiency when the engine is operating under a heavy load at a high speed.

According to the present invention, there is provided an intake device of an internal combustion engine comprising: an intake valve having a valve stem; an axially extending intake port passage having an inlet opening at one end thereof and having an outlet opening at the other end thereof, said intake port passage having a substantially cylindrically extending circumferential wall which circumferentially extends about the valve stem, a first side wall which extends between the inlet opening and the circumferential wall along an axis of the intake port passage, a second side wall which extends between the inlet opening and the circumferential wall along the axis of he intake port passage and is arranged to face the first side wall, an upper wall which extends between the inlet opening and the circumferential wall along the axis of the intake port passage, and a bottom wall which extends between the inlet opening and the circumferential wall along the axis of the intake port passage; a separating wall projecting downward from the upper wall and spaced from the bottom wall, the separating wall extending along the axis of the intake port passage and being spaced from the circumferential wall for defining a helical portion having a helix terminating portion between the separating wall and the circumferential wall, the separating wall being spaced from the first side wall for defining therebetween an inlet passage portion tangentially connected to the helical portion, the separating wall being spaced from the second side wall for defining therebetween a bypass passage which interconnecting the inlet passage portion to the helix terminating portion; a normally closed valve means arranged in the bypass passage for controlling the flow area of the bypass passage, an actuating means for actuating the valve means in response to the change in the operating condition of the engine to open the valve means when the engine is operating at a high speed under a heavy load; and a rib projecting downward from a bottom face of the separating wall and extending toward the helical portion from the valve means.

The present invention may be more fully understood from the description of a predetered embodiment of the invention set for the below, together with the accompanying drawings.

DESCRIPTION OF A PREFERRED EMBODIMENT

Figure 1:
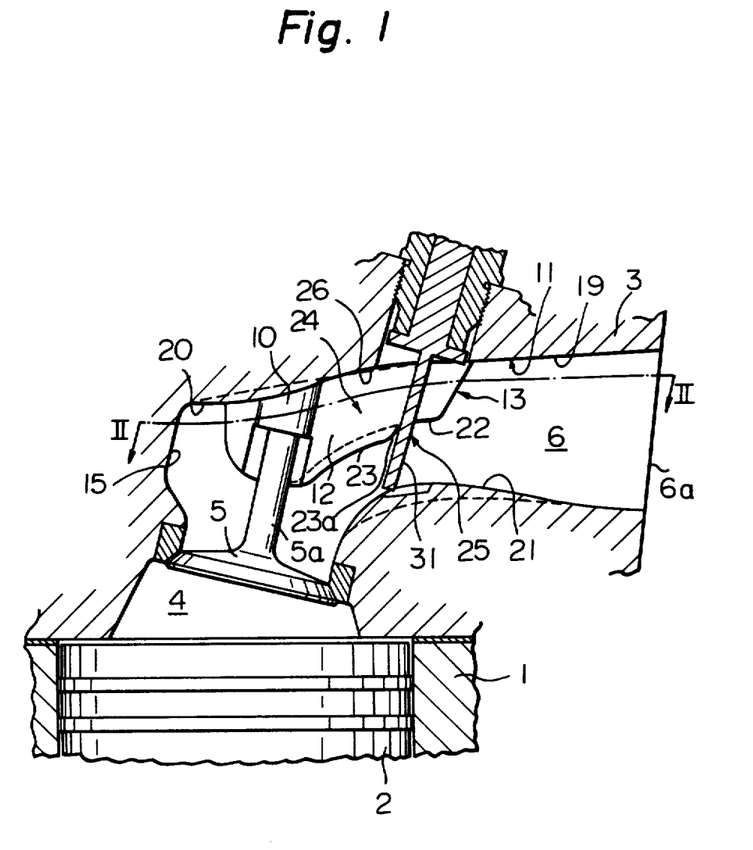
FIG. 1 is a cross-sectional side view of an internal combustion engine according to the present invention, taken along the line I—I in FIG. 2.
Figure 2:
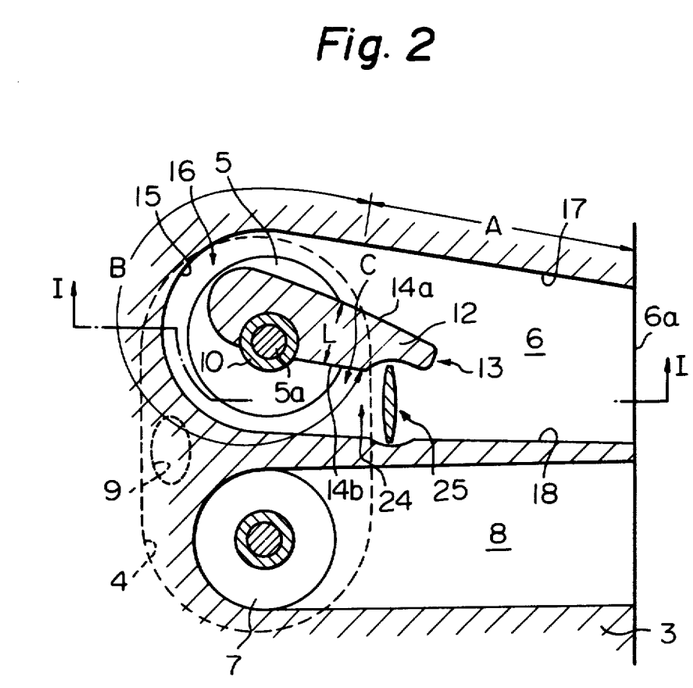
FIG. 2 is a cross-sectional plan view taken along the line II—II in FIG. 1.
Figure 3:
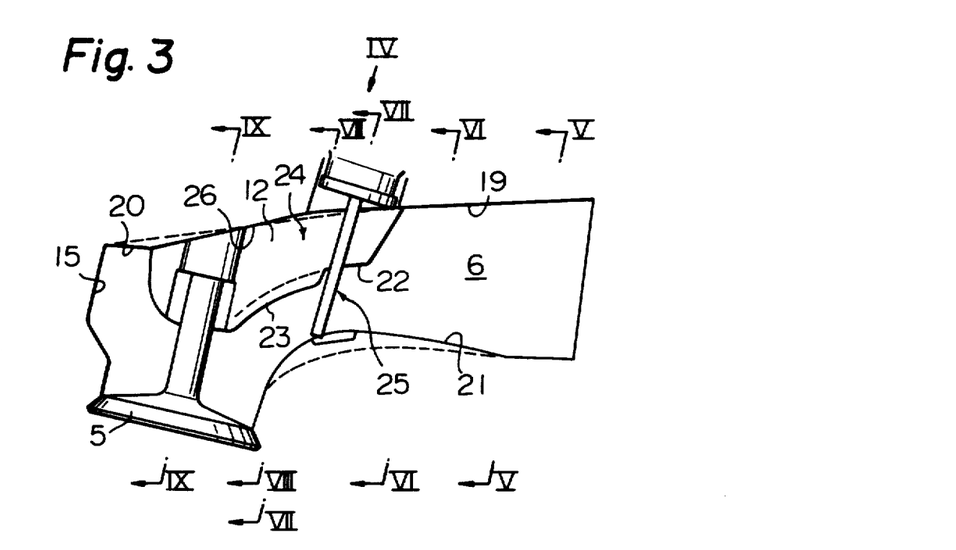
FIG. 3 is a side view of a helically-shaped intake port according to the present invention.

Referring to FIGS. 1 and 2, reference numeral 1 designates a cylinder block, 2 a piston reciprocally movable in the cylinder block 1, 3 a cylinder head fixed onto the cylinder block 1, and 4 a combustion chamber formed between the piston 2 and the cylinder head 3; 5 designates an intake valve, 6 a helically-shaped intake port formed in the cylinder head 3, 7 an exhaust valve, and 8 an exhaust port formed in the cylinder head 3; 9 designates a spark plug arranged in the combustion chamber 4, and 10 a stem guide for guiding the stem 5a of the intake valve 5. As illustrated in FIGS. 1 and 2, a downwardly projecting separating wall 12 is formed in one piece on the upper wall 11 of the intake port 6, and the helical portion B and the inlet passage portion A tangentially connected to the helical portion B are formed by the separating wall 12. The separating wall 9 extends from the interior region of the inlet passage portion A to the region around the stem 5a of the intake valve 5 and, from FIG. 2, it is understood that the width L of the root portion of the separating wall 12 is gradually increased as the measuring point of the width L approaches the stem guide 10 from the inlet passage portion A. The separating wall 12 has a tip portion 13 located at a position which is nearest the inlet opening 6a of the intake port 6. In addition, the separating wall 12 comprises a first side wall 14a extending counterclockwise in FIG. 2 from the tip portion 13 to the stem guide 10, and a second side wall 14b extending clockwise in FIG. 2 from the tip portion 13 to the stem guide 10. The first side wall 14a extends near the stem guide 10 from the tip portion 13 to a position near the side wall 15 of the helical portion B, and the first side wall 14a and the side wall 15 define a narrow passage portion 16 therebetween. Then, the first side wall 14a extends to the stem guide 10 while curving so that the first side wall 14a gradually leaves the side wall 15 of the helical portion B. The second side wall 14b extends substantially straight from the tip portion 13 to the stem guide 10.

Figure 4:
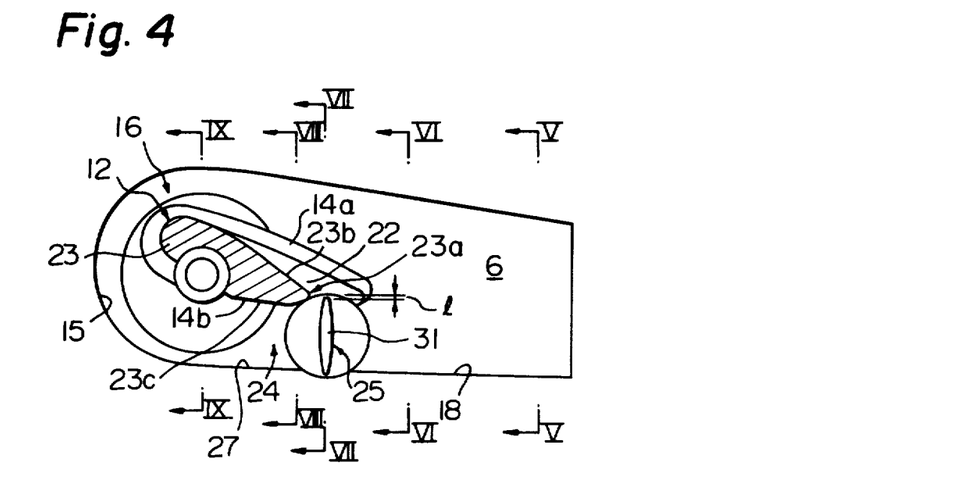
FIG. 4 is a plan view of a helically-shaped intake port according to the present invention.
Figure 5:
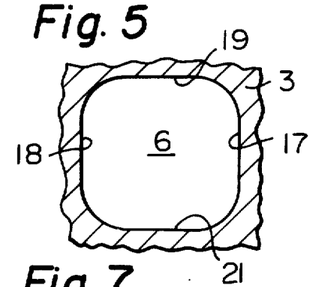
FIG. 5 is a cross-sectional view taken along the line V—V in FIGS. 3 and 4.
Figure 6:
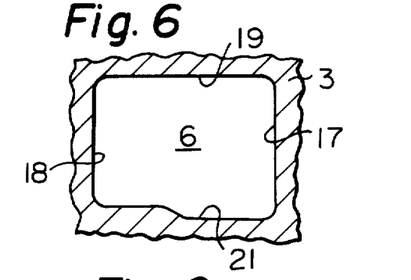
FIG. 6 is a cross-sectional view taken along the line VI—VI in FIGS. 3 and 4.
Figure 7:
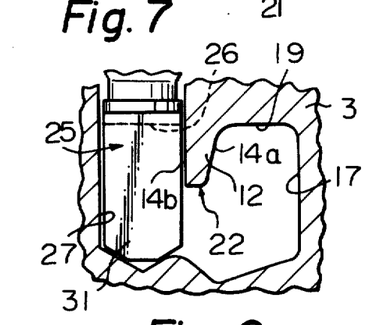
FIG. 7 is a cross-sectional view taken along the line VII—VII in FIGS. 3 and 4.
Figure 8:
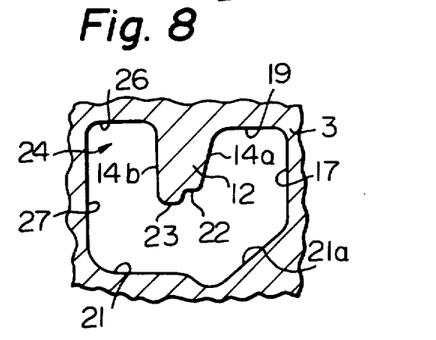
FIG. 8 is a cross-sectional view taken along the line VIII—VIII in FIGS. 3 and 4.
Figure 9:
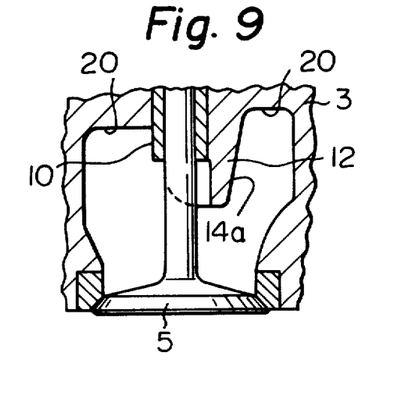
FIG. 9 is a cross-sectional view taken along the line IX—IX in FIGS. 3 and 4.

Referring to FIGS. 1 through 9, the side walls 17, 18 of the inlet passage portion A are substantially vertically arranged, and the upper wall 19 of the inlet passage portion A gradually descends toward the helical portion B. The side wall 17 of the inlet passage portion A is smoothly connected to the side wall 15 of the helical portion B, and the upper wall 19 of the inlet passage portion A is smoothly connected to the upper wall 20 of the helical portion B. The upper wall 20 of the helical portion B gradually descends toward the narrow passage portion 16 from the connecting portion of the inlet passage portion A and the helical portion B. In addition, the width of the upper wall 20 of the helical portion B is graudally reduced toward the narrow passage portion 16 from the connecting portion of the inlet passage portion A and the helical portion B. Then, the width of the upper wall 20 is gradually increased toward the helix terminating portion C of the helical portion B from the narrow passage portion 16. The entire bottom wall 21 of the inlet passage portion A is substantially horizontally arranged at a position near the inlet opening 6a of the intake port 6 as illustrated in FIG. 5. As the bottom wall 21 approaches the helical portion B, the bottom wall portion 21a located adjacent to the side wall 17 is gradually raised and forms an inclined face as illustrated in FIG. 8. The inclined angle of the bottom wall portion 21a is gradually increased toward the helical portion B.

The first side wall 14a of the separating wall 12 is slightly inclined so as to be directed downward, and the second side wall 14b is substantially vertically arranged. The bottom face 22 of the separating wall 12 descends, while slightly curing, toward the helical portion B from the inlet passage portion A so that the distance between the bottom face 22 of the separating wall 12 and the upper wall 19 of the inlet passage portion A is gradually icreased toward the stem guide 10 from the tip portion 13. A downwardly projecting rib 23 is formed on the bottom face 22 of the separating wall 12 in a region illustrated by the hatching in FIG. 4, and the bottom face of the rib 23 and the bottom face 22 form a slightly curved and inclined face. The rib 23 has a tip portion 23a located at a position which is nearest the inlet opening 6a of the intake port 6. In addition, the rib 23 comprises a first side wall 23b extending counterclockwise in FIG. 4 from the tip portion 23a, and a second side wall 23c extending clockwise in FIG. 4 from the tip portion 23a. The first side wall 23b extends toward the narrow passage portion 16 and is smoothly connected to the first side wall 14a of the separating wall 12. The second side wall 23c of the rib 23 is located in a plane which is almost the same as the plane in which the second side wall 14b of the separating wall 12 is located. The bottom face 22 of the rib 23, which is illustrated by the hatching in FIG. 4, has a shape which is similar to the cross-sectional shape of the root portion of the separating wall 12, which cross-sectional shape is illustrated in FIG. 2. In addition, as illustrated in FIG. 1, the bottom face of the rib 23 descends, while slightly curving, towards the helical portion B from the inlet passage portion A so that the distance between the bottom face of the rib 23 and the upper wall 11 of he intake port 6 is gradually increased toward the stem guide 10 from the tip portion 23a.

A bypass passage 24, interconnecting the inlet passage portion A to the helix terminating portion C of the helical portion B, is formed in the cylinder head 3, and a rotary valve 25 is arranged in the inlet portion of the bypass passage 24. The bypass passage 24 is separated from the inlet passage portion A by the separating wall 12, and the lower space of he bypass passage 24 is in communication with the inlet passage portion A over the entire length of the bypass passage 24. The upper wall 26 of the bypass passage 24 has an approximately uniform width. This upper wall 26 gradually descends toward the helix terminating portion C and is smoothly connected to the upper wall 20 of the helical portion B. The side wall 27 of the bypass passage 24, which faces the second side wall 14b of the separating wall 12, is substantially vertically arranged and located approximately on the extension of the side wall 18 of he inlet passage portion A. As can be seen from FIG. 1, the tip portion 23a of the rib 23 formed on the bottom face 22 of the separating wall 12 is located downstream of and near the rotary valve 25 when the rotary valve 25 is located at the closed position. Consequently, the rib 23 extends toward the stem guide 10 from a position which is located downstream of and near the rotary valve 25 when the rotary valve 25 is located at the closed position.

Figure 10:
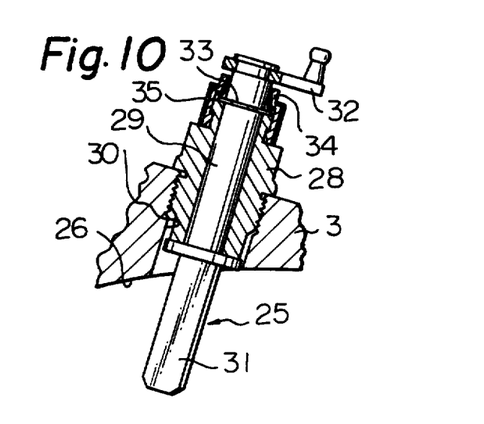
FIG. 10 is a cross-sectional side view of a rotary valve.

As illustrated in FIG. 10, the rotary valve 25 comprises a rotary valve holder 28 and a valve shaft 29 rotatably supported by the rotary valve holder 28. The rotary valve holder 28 is screwed into and fixed into a valve insertion bore 30 formed in the cylinder head 3. A thin plate-shaped valve body 31 is formed on the lower end of the valve shaft 29 and extends between the bottom wall 21 and the upper wall 26 of the bypass passage 24 as illustrated in FIG. 1. An arm 32 is attached to the top end of the valve shaft 29. A ring groove 33 is formed on the outer circumferential wall of the valve shaft 29, and an E-shaped positioning ring 34 is fitted into the ring groove 33. In addition, a seal member 35 is fitted onto the upper portion of the rotary valve holder 28, and the sealing operation of the valve shaft 29 is carried out by means of the seal member 35.

Figure 11:
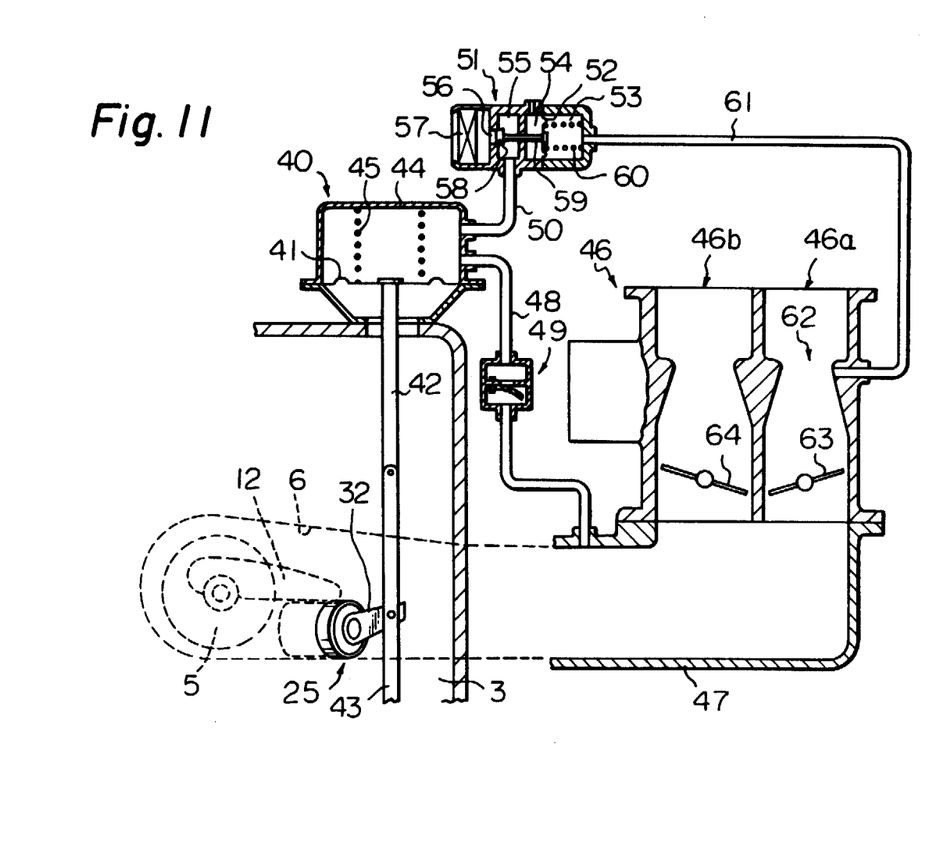
FIG. 11 is a view of a rotary valve drive control device.

Referring to FIG. 11, the tip of the arm 32 fixed onto the top end of the rotary valve 25 is connected via a connecting rod 43 to a control rod 42 which is fixed onto a diaphragm 41 of a vacuum operated diaphragm apparatus 40. The diaphragm apparatus 40 comprises a vacuum chamber 44 separated from the atmosphere by the diaphragm 41, and a compression spring 45 for biasing the diaphragm 41 is inserted into the vacuum chamber 44.

An intake manifold 47, equipped with a compound type carburetor 46 comprising a primary carburetor 46a and a secondary carburetor 46b, is mounted on the cylinder head 3, and the vacuum chamber 44 is connected to the interior of the intake manifold 47 via a vacuum conduit 48. A check valve 49, permitting air to flow from the vacuum chamber 44 into the intake manifold 47, is arranged in the vacuum conduit 48. In addition, the vacuum chamber 44 is connected to the atmosphere via an atmosphere conduit 50 and a control valve 51. This control valve 51 comprises a vacuum chamber 53 and an atmospheric pressure chamber 54 which are separated by a diaphragm 52. In addition, the control valve 51 further comprises a valve chamber 55 arranged adjacent to the atmospheric pressure chamber 54. The valve chamber 55 is connected, at one end, to the vacuum chamber 44 via the atmosphere conduit 50 and, at the other end, to the atmosphere via a valve port 56 and an air filter 57. A valve body 58, controlling the opening operation of the valve port 56, is arranged in the valve chamber 55 and connected to the diaphragm 52 via a valve rod 59. A compression spring 60 for biasing the diaphragm 52 is inserted into the vacuum chamber 53, and the vacuum chamber 53 is connected to a venturi portion 62 of the primary carburetor A via a vacuum conduit 61.

The carburetor 46 is a conventional carbutetor. Consequently, when the opening degree of a primary throttle valve 63 is increased beyond a predetermined degree, a secondary throttle valve 64 is opened. When the primary throttle valve 63 is fully opened, the secondary throttle valve 64 is also fully opened. The level of vacuum produced in the venturi portion 62 of the primary carburetor 46a is increased at the amount of air fed into the cylinder of the engine is increased. Consequently, when a great vacuum is produced in the venturi portion 62, that is, when the engine is operating at a high speed under a heavy load, the diaphragm 52 of the control valve 51 moves toward the right in FIG. 11 against the compression spring 60. As a result, the valve body 58 opens the valve port 56. Thus, the vacuum chamber 44 of the diaphragm apparatus 40 becomes open to the atmosphere. At this time, the diaphragm 41 moves downward in FIG. 11 due to the spring force of the compression spring 45 and, thus, the rotary valve 25 is rotated and fully opens the bypass passage 24.

On the other hand, in the case wherein the opening degree of the primary throttle valve 63 is small, since the vacuum produced in the venturi portion 62 is small, the diaphragm 52 of the control valve 51 moves toward the left in FIG. 11 due to the spring force of the compression spring 60. As a result, the valve body 58 closes the valve port 56. In addition, in the case wherein the opening degree of the primary throttle valve 63 is small, a great vacuum is produced in the intake manifold 47. Since the check valve 49 opens when the level of vacuum produced in the intake manifold 47 becomes greater than that of the vacuum produced in the vacuum chamber 44, and since the check valve 49 closes when the level of the vacuum produced in the intake manifold 47 becomes smaller than that of the vacuum produced in the vacuum chamber 44, the level of the vacuum in the vacuum chamber 44 is maintained at the maximum vacuum which has been produced in the intake manifold 47 as long as the control valve 51 remains closed. If a vacuum is produced in the vacuum chamber 44, the diaphragm 41 moves upward in FIG. 11 against the compression spring 45. As a result, the rotary valve 25 is rotated and closes the bypass passage 24. Consequently, when the engine is operating at a low speed under a light load, the bypass passage 24 is closed by the rotary valve 25. In the case wherein the engine speed is low even if the engine is operating under a heavy load, and in the case wherein the engine speed is operating under a light load even if the engine speed is high, since the vacuum produced in the venturi portion 62 is small, the control valve 51 remains closed. Consequently, when the engine is operating at a low speed under a heavy load and at a high speed under a light load, since the level of the vacuum in the vacuum chamber 44 is maintained at the above-mentioned maximum vacuum, the bypass passage 24 is closed by the rotary valve 25.

As mentioned above, when the engine is operating at a low speed under a light load, that is, when the amount of air fed into the cylinder of the engine is small, the rotary valve 25 closes the bypass passage 24. At this time, a part of the mixture introduced into the inlet passage portion A moves forward along the upper walls 19, 20. In addition, at this time, the remaining part of the mixture impinges upon the rotary valve 25, and the flow direction thereof is deflected toward the side wall 17 of the inlet passage portion A. Then, the remaining part of the mixture is guided by the first side wall 23b (FIG. 4) of the rib 23 and moves forward toward the narrow passage portion 16.

If the rib 23 is not provided, the mixture which impinges upon the rotary valve 25 enters into a region located behind the rotary valve 25 and generates a vortex therein. However, this vortex serves to reduce the velocity of the mixture which swirls along the side wall 15 of the helical portion B. In addition, since the size of the vortex is not fixed, and the vortex generates at an irregular time interval, not only the velocity of the swirling mixture is reduced as mentioned above, but also the intensity of the swirl motion fluctuates. Nevertheless, if the rib 23 is provided, the mixture which impinges upon the rotary valve 25 is guided by the rib 23 and moves forward toward the narrow passage portion 16 and, thus, this mixture contributes in creating the swirl motion.

As mentioned above, since the widths of the upper walls 19, 20 are gradually reduced toward the narrow passage portion 16, the cross-section of the flow path of the mixture flowing along the upper walls 19, 20 is gradually reduced toward the narrow passage portion 16. Thus, the velocity of the mixture flowing along the upper walls 19, 20 is gradually increased. In addition, as mentioned above, since the first side wall 14a of the separating wall 12 extends to a position near the side wall 15 of the helical portion B, the mixture flowing along the upper walls 19, 20 is compulsorily led onto the side wall 15 of the helical portion B and then moves forward along the side wall 15. As a result, a strong swirl motion is created in the helical portion B. Then, the swirling mixture flows into the combustion chamber 4 via the valve gap formed between the intake valve 5 and its valve seat and causes a strong swirl motion in the combustion chamber 4.

When the engine is operating at a high speed under a heavy load, that is, when the amount of air fed into the cylinder of the engine is large, since the rotary valve 25 opens the bypass passage 24, the mixture introduced into the inlet passage portion A is divided into three mixture streams. That is, the first mixture stream is a mixture stream flowing into the intake port 6 between the first side wall 14a of the separating wall 12 and the side wall 17 of the inlet passage portion A and then flowing, while swirling, along the upper wall 17 of the helical portion B. The second mixture stream is a mixture stream which flows into the helical portion B through the bypass passage 24. The third mixture stream is a mixture stream which flows into the helical portion B along the bottom wall 21 of the inlet passage portion A. The flow resistance of the bypass passage 24 is smaller than that of the flow path formed between the first side wall 14a and the side wall 17 and, thus, the amount of the second mixture stream becomes larger than that of the first mixture stream. In addition, the flow direction of the first mixture stream flowing, while swirling, within the helical portion B is deflected downward by the second mixture stream and, thus, the swirl motion of the first mixture stream is weakened. As mentioned above, since the amount of the mixture which flows within the bypass passage 24 having a small flow resistance is increased, and the flow direction of the first mixture stream is deflected downward, it is possible to obtain a high volumetric efficiency. In addition, as mentioned above, since the bottom face 22 of the separating wall 21 is inclined so as to be directed downward, the third mixture stream is guided by the bottom face 22 of the separating wall 21 so that the flow direction of the third mixture stream is deflected downward. Thus, it is possible to obtain a even higher volumetric efficiency.

Figure 12:
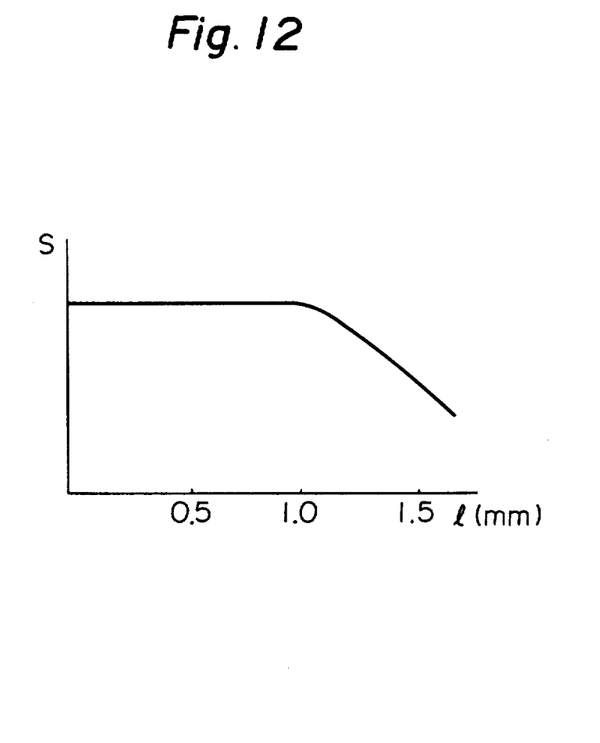
FIG. 12 is a graph of the intensity of a swirl motion.

As mentioned above, it is possible to obtain an strong swirl motion by forming the rib 23 on the bottom face 22 of the separating wall 12. However, it has been proven that the positional relationship between the tip portion 23a of the rib 23 and the end portion of the valve body 31 of the rotary valve 25 has an influence on the intensity of the swirl motion. That is, as illustrated in FIG. 4, if the distance between the tip portion 23a of the rib 23 and the end portion of the valve body 31, which distance is measured in a direction perpendicular to the longitudinal direction of the intake port 6, is defined as l, this distance l has an influence on the intensity of the swirl motion as illustrated in FIG. 12. In FIG. 12, the ordinate S indicates the number of revolutions of the swirl motion per unit time, and the abscissa indicates the distance l. From FIG. 12, it is understood that the distance l has no influence on the number of revolutions of the swirl motion S when the distance l is smaller than 1 mm, while, if the distance l becomes larger than 1 mm, the mixture enters into the bypass passage 24 via the rotary valve 25 and causes the swirl motion to be weakened. Consequently, from FIG. 12, it is understood that it is necessary to arrange the rotary valve 25 so that the distance l is smaller than 1 mm.

In the present invention, the intake port 6 can be formed by forming the separating wall 12 in one piece on the upper wall of the intake port 6. Consequently, it is possible to easily manufacture the helically-shaped intake port.

According to the present invention, when the engine is operating under a light load at a low speed, since the bypass passage is closed, a large amount of the mixture is caused to flow along the upper wall of the helical portion. In addition, at this time, the mixture, which impinges upon the rotary valve, is guided by the rib and contributes in creating the swirl motion. Consequently, it is possible to create a strong swirl motion in the combustion chamber. When the engine is operating under a heavy load at a high speed, since the bypass passage is opened, a large amount of the mixture flows into the helical portion via the bypass passage having a low flow resistance. In addition, at this time, the flow direction of the mixture flowing along the bottom wall of the inlet passage portion is deflected downward by the bottom face of the separating wall. Therefore, it is possible to obtain a high volumetric efficiency.

While the invention has been described by reference to a specific embodiment chosen for the purpose of illustration, it should be apparent that numerous modifications can be made thereto by those skilled in the art without departing from the basic concept and scope of the invention.

We claim:

1. An intake device of an internal combustion engine comprising:

an intake valve having a valve stem;

an axially extending intake port passage having an inlet opening at one end thereof and having an outlet opening at the other end thereof, said intake port passage having a substantially cylindrically extending circumferential wall which circumferentially extends about said valve stem, a first side wall which extends between said inlet opening and said circumferential wall along an axis of said intake port passage, a second side wall which extends between said inlet opening and said circumferential wall along the axis of said intake port passage and is arranged to face said first side wall, an upper wall which extends between said inlet opening and said circumferential wall along the axis of said intake port passage, and a bottom wall which extends between said inlet opening and said circumferential wall along the axis of said intake port passage;

a separating wall projecting downward from said upper wall and spaced from said bottom wall, said separating wall extending along the axis of said intake port passage and being spaced from said circumferential wall for defining a helical portion having a helix terminating portion between said separating wall and said circumferential wall, said separating wall being spaced from said first side wall for defining therebetween an inlet passage portion tangentially connected to said helical portion, said separating wall being spaced from said second side wall for defining therebetween a bypass passage which interconnecting said inlet passage portion to said helix terminating portion;

a normally closed valve means arranged in said bypass passage for controlling the flow area of said bypass passage;

an actuating means for actuating said valve means in response to the change in the operating condition of the engine to open said valve means when the engine is operating at a high speed under a heavy load; and a rib projecting downward from a bottom face of said separating wall and extending toward said helical portion from said valve means.

2. An intake device according to claim 1, wherein said rib extends toward said helical portion from a position which is located downstream of and near said valve means.

3. An intake device according to claim 1, wherein said rib has a contour shape which is similar to the cross-sectional shape of said separating wall.

4. An intake device according to claim 1, wherein said rib has a tip portion which is located nearest said inlet opening, the distance between said tip portion and said valve means, which is measured perpendicular to the axis of said intake port passage, being smaller than 1 mm.

5. An intake device according to claim 1, wherein the bottom face of said separating wall is spaced from the bottom wall of said intake port passage and gradually leaves the upper wall of said intake port passage as the bottom face of said separating wall approaches said helical portion.

6. An intake device according to claim 5, wherein said rib has a bottom face spaced from the bottom wall of said intake port passage and gradually leaving from the upper wall of said intake port passage as the bottom face of said rib approaches said helical portion.

7. An intake device according to claim 1, wherein said separating wall has a transverse width which is gradually increased towards said helical portion.

8. An intake device according to claim 1, wherein said separating wall extends to a position near said circumferential wall for defining a narrow passage portion therebetween.

9. An intake device according to claim 8, wherein said upper wall, located between said separating wall and said circumferential wall, has a width which is gradually increased from said narrow passage portion toward said helix terminating portion.

10. An intake device according to claim 1, wherein said separating wall has an inclined side wall defining said inlet passage portion and directed downward.

11. An intake device according to claim 1, wherein said separating wall has a substantially vertical side wall defining said bypass passage, said second side wall being substantially vertically arranged so that said bypass passage has a substantially uniform transverse width.

12. An intake device according to claim 1, wherein said upper wall, located between said separating wall and said first side wall, has a width which is gradually reduced toward said helical portion.

13. An intake device according to claim 1, wherein said first side-wall is substantially vertically arranged.

14. An intake device according to claim 1, wherein said bottom wall has an inclined portion located adjacent to said first side wall, the inclined angle of said inclined portion being gradually increased toward said helical portion.

15. An intake device according to claim 1, wherein said bypass passage has an inlet portion which is open to said inlet passage portion, said valve means being arranged in said inlet portion.

16. An intake device according to claim 1, wherein said valve means comprises a rotary valve rotatably arranged in said bypass passage.

17. An intake device according to claim 16, wherein said rotary valve has a thin plate-shaped valve body extending between said upper wall and said bottom wall.

18. An intake device according to claim 17, wherein said valve body has a width which is substantially equal to the transverse width of said bypass passage.

19. An intake device according to claim 1, wherein said actuating means actuates said valve means in response to the amount of air fed into said intake port passage and opens said valve means when said amount of air is increased beyond a predetermined value.

20. An intake device according to claim 19, wherein said actuating means comprises a vacuum chamber, a diaphragm connected to said rotary valve and actuated in response to a change in the level of the vacuum in said vacuum chamber, and a control apparatus maintaining the level of the vacuum in said vacuum chamber at the maximum vacuum which has been produced in the intake port passage when the amount of air fed into the intake port passage is smaller than said predetermined value and connecting said vacuum chamber to the atmosphere when said amount of air is larger than said predetermined value.

21. An intake device according to claim 20, wherein said control apparatus comprises a check valve arranged between the intake port passage and said vacuum chamber for allowing only the outflow of air from said vacuum chamber, and a control valve for controlling the fluid connection between said vacuum chamber and the atmosphere to connect said vacuum chamber to the atmosphere when said amount of air is larger than said predetermined value.

22. An intake device according to claim 21, wherein the engine comprises a carburetor connected to the intake port passage and having a venturi portion, said control valve being actuated in response to a change in the level of the vacuum produced in said venturi portion.

23. An intake device according to claim 22, wherein said control valve comprises a valve body for controlling fluid connection between said vacuum chamber and the atmosphere, a vacuum cavity connected to said venturi portion, and a diaphragm connected to said valve body and actuated in response to a change in the level of the vacuum produced in said vacuum cavity.

* * * * *